US005995307A

United States Patent [19]

Kang

[11] Patent Number: 5,995,307

[45] Date of Patent: Nov. 30, 1999

[54] METHOD OF FORCIBLY JUDGING A SECTOR SYNCHRONOUS SIGNAL FOR A DISK REPRODUCING APPARATUS

[75] Inventor: Ki Won Kang, Seoul, Rep. of Korea

[73] Assignee: LG Electronics Inc., Seoul, Rep. of Korea

[21] Appl. No.: 08/772,847

[22] Filed: Dec. 24, 1996

[30] Foreign Application Priority Data

Dec. 29, 1995 [KR] Rep. of Korea ...................... 95-62074

[51] Int. Cl.[6] ................................ G11B 5/09; H04N 5/76

[52] U.S. Cl. ................................ 360/51; 360/49; 369/59

[58] Field of Search ................................... 360/73.03, 32, 360/67, 53, 48, 49, 12.08; 369/48, 58, 32, 49, 50, 51, 44.26, 59; 386/111, 68, 95; 371/37.5; 375/365, 366, 368; 370/513, 514

[56] References Cited

U.S. PATENT DOCUMENTS

| | | | |
|---|---|---|---|
| 5,293,549 | 3/1994 | Ichikawa | 360/51 |
| 5,321,560 | 6/1994 | Cowen | 360/48 |
| 5,706,265 | 1/1998 | Bang | 360/73.03 X |

*Primary Examiner*—W. Chris Kim

[57] ABSTRACT

A method of judging a sector synchronous signal for a disk reproducing apparatus, includes a first step for decoding and storing a synchronous signal, a second step for comparing the decoded synchronous signal with a reference sector synchronous signal, a third step for assuming the detected synchronous signal to be a sector synchronous signal when the decoded synchronous signal and the reference sector synchronous signal are identical based on a result of the second step, a fourth step for judging whether the synchronous signal stored before the decoded synchronous signal indicates a desired state, and a fifth step for finally judging that the assumed sector synchronous signal is a sector synchronous signal based on a result of the fourth step.

15 Claims, 3 Drawing Sheets

1st FRAME SYx1
2nd FRAME SYx2
3nd FRAME SYx3
n-th FRAME SYxn
FRAME
WHERE, X1=0, .... a
X2=Xn=0 .... a except X1

METHOD OF FORCIBLY JUDGING A SECTOR SYNCHRONOUS SIGNAL FOR A DISK REPRODUCING APPARATUS

BACKGROUND OF THE INVENTION

1. Field of the Invention

The present invention relates to a sector synchronous signal judgement and generation method for a disk reproducing apparatus and more to an improved sector synchronous signal judgement and generation method for a disk reproducing apparatus which is capable of preventing an erroneous recognition of a sector synchronous signal due to a noise or bit errors and generating a sector synchronous signal which was missed.

2. Description of the Conventional Art

Generally, a compact disk (CD) is widely used for a disk reproducing system as a reproducing medium. The CD uses only a frame synchronous signal which can be expressed in various forms (for example, 1000000000001000000000001).

However, a sector synchronous signal for separating a sector exists in a digital video disk (DVD) system in addition to the frame synchronous signal. In the DVD system, the sector synchronous signal cannot be expressed as the frame synchronous signal as in the CD because the sector synchronous signal has various restrictions in a coding method, a signal offset of a low frequency band width, etc. Therefore, one synchronous signal is arranged in a head portion of each sector for separating the sectors after various kinds of synchronous signals are generated.

FIG. 1 is a view illustrating a synchronous signal used in a conventional digital video disk.

As shown therein, on the assumption that there is a "a" number of synchronous signals, each synchronous signal (SY0, . . . , SYa) including an the m-number of binary bits.

In addition, each synchronous signal (SY0, . . . , SYa) includes a bit X and a frame synchronous signal "frame sync". The bit X is formed of 0 and 1, and the frame synchronous signal is of a fixed type.

FIG. 2 is a view illustrating a conventional sector structure.

As shown therein, one synchronous signal SYxl among various synchronous signals is used as a synchronous signal of a first frame of the sector, and the other synchronous signals (SYx2, . . . , SYxn) are used as the synchronous signal of the remaining frames. Namely, when the synchronous signal SYx1 is detected, the thusly detected synchronous signal SYx1 becomes a sector synchronous signal.

However, when detecting the sector synchronous signal by using the above-described structure, the sector synchronous signal SYx1 may be lost due to noise or the like at the moment when the sector synchronous signal SYx1 is detected and is mistakenly judged as another signal, thereby causing a malfunction in the system and degrading the quality of a picture to be displayed.

Furthermore, since the CD judges the sector synchronous signal by using only the frame synchronous signal, it is impossible to properly match with the synchronous signal having various types as in the DVD, thereby increasing the possibility of the errors.

SUMMARY OF THE INVENTION

Accordingly, it is an object of the present invention to provide a method of judging a sector synchronous signal for a disk reproducing apparatus which overcomes the aforementioned problems and other disadvantages encountered in the conventional art.

It is another object of the present invention to provide an improved method of judging a sector synchronous signal for a disk reproducing apparatus which is capable of preventing an erroneous recognition of a sector synchronous signal due to a noise or bit errors and generating a sector synchronous signal which was missed.

It is another object of the present invention to provide an improved method of judging a sector synchronous signal for a disk reproducing apparatus which is capable of detecting a synchronous signal positioned in a head portion of each sector, judging a synchronous signal pattern, checking the pattern of the synchronous signal inputted before the detected synchronous signal, and performing a synchronous signal judgement and generation operation, thereby preventing an erroneous recognition of the sector synchronous signal and generating a sector synchronous signal which was missed.

To achieve the above and other objects, in accordance with a first embodiment of the present invention, there is provided a method of judging a sector synchronous signal for a disk reproducing apparatus which includes the steps of a first step for decoding a synchronous signal, a second step for comparing a decoded synchronous signal pattern with a reference sector synchronous signal pattern, a third step for storing a predetermined synchronous signal pattern and assuming the decoded synchronous signal as a sector synchronous signal when the synchronous signal pattern and the reference sector synchronous signal pattern are identical as a result of the second step, a fourth step for judging whether the stored synchronous signal pattern is a desired pattern, and a fifth step for finally judging the assumed sector synchronous signal as a sector synchronous signal when the stored synchronous signal pattern is a desired pattern as a result of the fourth step.

To achieve the above and other objects, in accordance with a second embodiment of the present invention, there is provided a method of judging a sector synchronous signal for a disk reproducing apparatus which includes the steps of a first step for decoding a synchronous signal, a second step for comparing a decoded synchronous signal pattern with a reference sector synchronous signal pattern, a third step for storing a predetermined synchronous signal pattern and assuming the decoded synchronous signal as a sector synchronous signal when the synchronous signal pattern and the reference sector synchronous signal pattern are identical as a result of the second step, a fourth step for judging whether the stored synchronous signal pattern is a desired pattern, a fifth step for finally judging the assumed sector synchronous signal as a sector synchronous signal when the stored synchronous signal pattern is a desired pattern as a result of the fourth step, a sixth step for judging whether the stored synchronous signal pattern is a desired pattern when the decoded sector synchronous signal is not a sector synchronous signal as a result of the comparison of the second step, and a seventh step for forcibly judging the decoded synchronous signal as a sector synchronous signal when a comparison result is related to a desired synchronous signal pattern.

To achieve the above and other objects, in accordance with a third embodiment of the present invention, there is provided a method of judging a sector synchronous signal for a disk reproducing apparatus which includes the steps of a first step for decoding a synchronous signal, a second step for comparing a decoded synchronous signal pattern with a reference sector synchronous signal pattern, a third step for storing a predetermined synchronous signal pattern and assuming the decoded synchronous signal as a sector synchronous signal when the synchronous signal pattern and the reference sector synchronous signal pattern are identical as a result of the second step, a fourth step for judging whether the stored synchronous signal pattern is a desired pattern, a fifth step for finally judging the assumed sector synchronous signal as a sector synchronous signal when the stored synchronous signal pattern is a desired pattern as a result of the fourth step, a sixth step for judging whether the stored synchronous signal pattern is a desired pattern when the decoded sector synchronous signal is not a sector synchronous signal as a result of the comparison of the second step, a seventh step for forcibly judging the decoded synchronous signal as a sector synchronous signal when a comparison result is related to a desired synchronous signal pattern, an eighth step for accumulatively counting the number and comparing with the reference number when a comparison result is not related to a desired synchronous signal pattern, and a ninth step for resetting a synchronous signal pattern when the accumulated count value exceeds a predetermined number.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The sector synchronous signal detection for a disk reproducing apparatus according to the present invention is basically performed in a reproducing system of a digital video disk (DVD).

The sector synchronous signal detection method of the disk reproducing apparatus according to the present invention will now be explained with reference to the accompanying drawings.

First, during the reproduction of a disk, a sector synchronous signal may be lost due to a noise or the like at the moment when the sector synchronous signal is detected, and is mistakenly judged as another signal.

Figure 3:
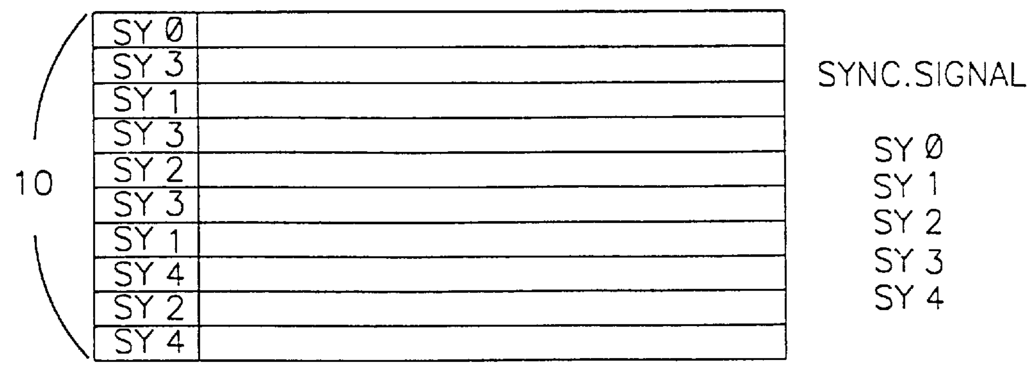
FIG. 3 is a view illustrating a sector structure having a type of 10 frames according to the present invention.

Therefore, it is necessary to check the surrounding conditions of the detected synchronous signal. As shown in FIG. 3, one sector formed of 10 frames will now be explained.

The sector synchronous signal SY0 is repeatedly outputted at every 10 frame. When there is no significant error in the detected sector synchronous signal SY0, the sector synchronous signal SY0 is outputted after 10 frames.

In addition, the synchronous signal must be detected before the sector synchronous signal SY0 is detected. The sector synchronous signal SY1 through SY4, . . . , SYn must be outputted before the detection of the sector synchronous signal SY0.

Therefore, the order of the synchronous signal detected before the sector synchronous signal SY0 is stored and may be used as a detection information of the sector synchronous signal SY0.

There is a limit to how many synchronous signals detected before the sector synchronous signal SY0 can be stored.

Of course, it is better to store many synchronous signals and to use them as an information, thereby obtaining a better result; however, the algorithm becomes complicated.

Generally, the digital video disk (DVD) includes 26 sectors.

In addition, one sector consists of a plurality of frames. In the present invention, one sector including 10 frames will now be explained with reference to FIG. 3.

Figure 4:
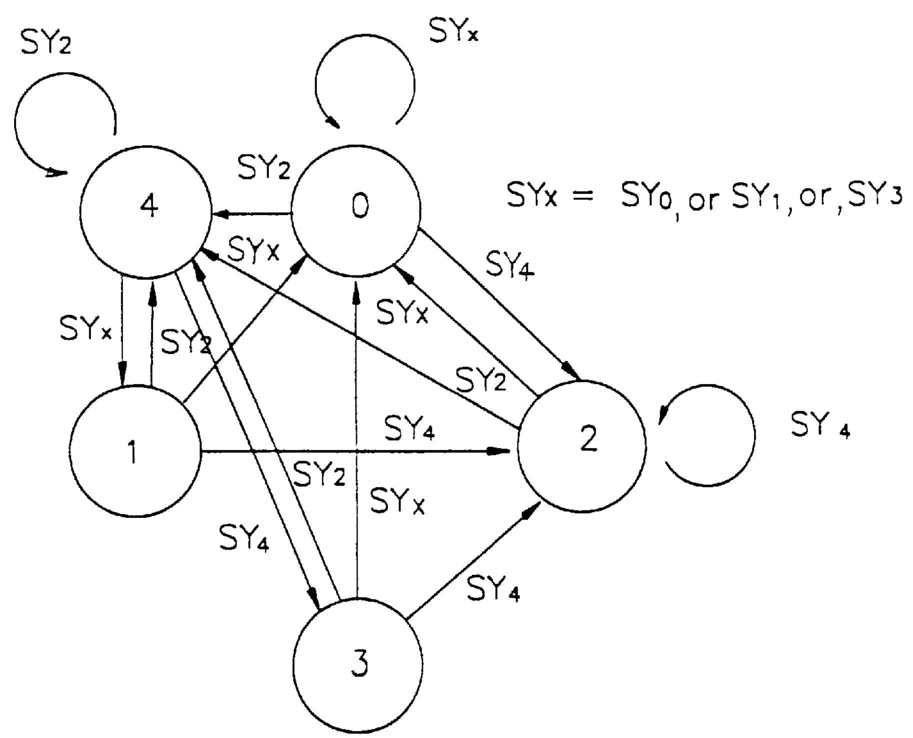
FIG. 4 is a view illustrating two synchronous signals inputted before a sector synchronous signal as shown in FIG. 3.

FIG. 4 is a view illustrating two synchronous signals inputted before a sector synchronous signal as shown in FIG. 3.

The state "0" denotes that two synchronous signals inputted before the sector synchronous signal are not SY2 and SY4.

Here, if two inputs are related to a predetermined SYx, which is not SY2 and SY4, the state thereof is returned to its self-state. If the input is related to SY2; the state is changed to state 4. If the input is related to SY4, the state is changed to state 2.

In addition, in state 1, if the input is SY2, the state is changed to state 4. If the input is SY4, the state is changed to state 2. If the input is SYx, which is neither SY2 nor SY4, the state is changed to state 0.

In state 2, if the input is SY4, the previous input is not SY2. In the case that the input is SY2, the state is changed to state 4, and in the case that the input is a predetermined SYx, which is neither SY2 nor SY4, the state is changed to state 0. If the input is SY4, the state returns to its self-state.

In state 3, two inputs are desired SY2 and SY4. In the case that the input is SY2, the state is moved to state 4. If the input is SY4, the state is changed to state 2, and if the input is a predetermined SYx, which is neither SY2 nor SY4, the state is changed to state 0.

State 4 denotes an intermediate state in which there is no significant even when the input is SY2, and is a predetermined value. In this state, in the case that the input is SY2, the state is changed to its self-state, and in the case that the input is a predetermined SYx, which is neither SY2 nor SY4, the state is changed to state 1.

In FIG. 4, the predetermined value SYx denotes one of SY0, SY1 and SY3.

In addition, the above-described state judging operation is repeatedly performed during the detection of the sector synchronous signal.

Figure 5:
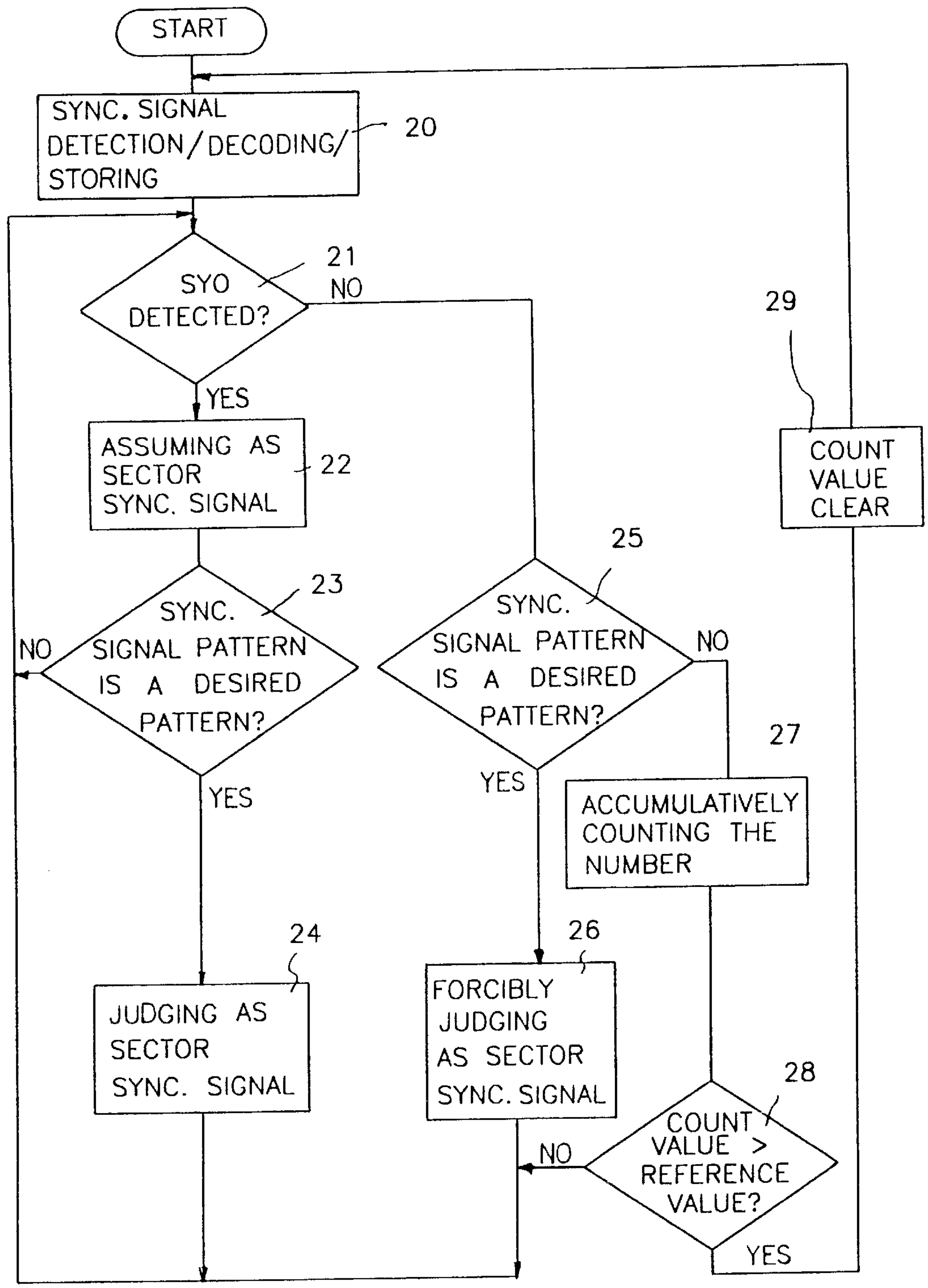
FIG. 5 is a flow chart in order to judge a sector synchronous signal according to the present invention.

FIG. 5 is a flow chart for judging a sector synchronous signal according to the present invention.

As shown therein, as the information used therein, there are state diagrams of the synchronous signal as shown in FIG. 4, the number of synchronous signals of the sector, and the usage of a window.

Figures 1, 2:
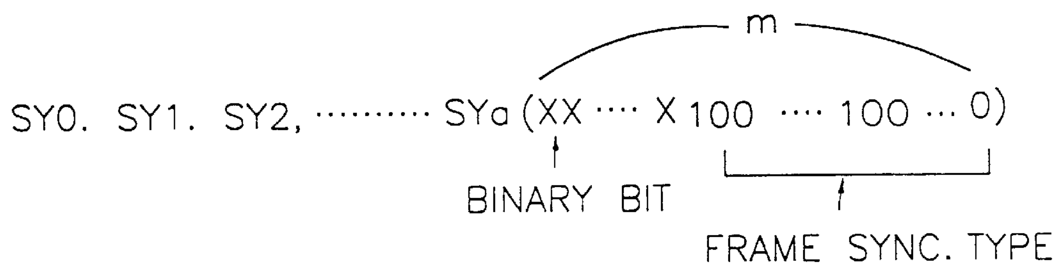
FIG. 1 is a view illustrating a synchronous signal used in a conventional digital video disk.
FIG. 2 is a view illustrating a conventional sector structure.

First, when a binary bit stream X and a synchronous signal as shown in, e.g., FIG. 1 are inputted to the disk reproducing system of the present invention, the controller (not shown) decodes and states the inputted synchronous signal and compares a predetermined synchronous signal pattern of the inputted synchronous signal with a reference synchronous signal pattern in steps 20 and 21.

Here, as shown in FIG. 3, on the assumption that one sector includes, e.g., 10 frames, the reference synchronous signal patterns are SY0, SYx1, SYx2, . . . , SYxn.

Therefore, the value SY0 is detected at initial stage. If the predetermined synchronous signal pattern of the detected synchronous signal is judged to be a sector synchronous signal pattern, the detected synchronous signal is assumed be a sector synchronous signal SY0 in step 22. Thereafter, it is judged whether the patterns SYx1, SYx2, . . . of the synchronous signal inputted before SY0 are desired SY2, SY4, . . . in step 23.

Here, as a checking method, a state diagram as shown in FIG. 4 and a window are used.

The, the method of using the state diagram is directed to checking whether the patterns SYx1 and SYx2 of two synchronous signals inputted before the assumed sector synchronous signal are desired patterns SY2 and SY3. Namely, it is checked whether the state value is 3.

Here, if the synchronous signal patterns SYx1 and SYx2 are judged to be desired patterns SY2 and SY4, the sector synchronous signal SY0 is judged to be an actual sector synchronous signal SY0.

In the alternative, in the method of using a window, since the value SY0 is normally detected, a part of the pattern among the patterns SYx1, SYx2, . . . of the synchronous signals is covered by the window and is compared to determined whether it is identical with the desired patterns SY2, SY4, . . .

For example, the desired patterns SY2 and SY4 can be compared by covering the values SYx1 and SY among the patterns SYx1, SYx2, . . . of the synchronous signals by using the window.

However, when the synchronous signal pattern is judged not to be a sector synchronous signal pattern since the value SY0 was not detected in step 21, it is judged whether the patterns SYx1, SYx2, . . . of the synchronous signal inputted before the synchronous signal SYx are the desired patterns SY2, SY4, . . . in step 25.

Namely, it is checked whether the patterns SYx1 and SYx2 of the synchronous signals are the desired patterns SY2 and SY4, i.e., it is checked whether the state value is 3. Since the value SY0 is not checked, the window is uncovered, and it is checked whether the entire synchronous signal patterns SYx1, SYx2, . . . are the desired patterns SY2, SY4, . . .

Here, if the synchronous signal patterns SYx1, SYx2, . . . are judged to be the desired patterns SY2, SY4, . . . , the synchronous signal SYx is forcibly judged as the sector synchronous signal SY0.

In this case, it denotes that the sector synchronous signal SY0 is lost due to noise or the like at the moment when the sector synchronous signal SY0 is detected or is mistakenly judged to be another signal, thereby generating a misjudged signal and a lost sector synchronous signal.

In addition, in step 25, if the synchronous signal patterns SYx1, SYx2, . . . are the finally desired patterns SY2, SY4, . . . , the number of synchronous signal is accumulatively counted and is compared with a reference value in step 27. If the count value is smaller than the reference value, the steps after step 21 are repeatedly performed. If the count value is greater than the reference value, the count value is cleared. Thereafter, the steps after step 20 are repeatedly performed in step 29. At this time, the reference value is 3.

In addition, based on the assumption that one sector includes 10 frames, the sector synchronous signal SY0 is outputted at every 10th frame.

Therefore, if there is no important error in the sector synchronous signal SY0 as detected, since the sector synchronous signal SY0 is outputted at every 10th frame, the frame coefficient, which is 10, may be used as data for detecting the sector synchronous signal SY0.

In addition, the sector ID may be used as a data. The data may be changed in accordance with the size of the window and the number of the frame synchronous signals.

As described above, a method judging a sector synchronous signal for a disk reproducing apparatus according to the present invention is basically directed to detecting a synchronous signal positioned at a head portion of each sector, judging the pattern of the synchronous signal, checking the pattern of the synchronous signal inputted before the detected synchronous signal, judging the sector synchronous signal, and performing a sector synchronous signal generation, thereby preventing the sector synchronous signal from being misjudged and the sector synchronous signal from being lost.

Further, the method of judging a sector synchronous signal for a disk reproducing apparatus according to the present invention stores the two frame synchronous signals which are successively inputted without using step 23 as a state diagram, compares the reference synchronous signals with the stored frame synchronous signals respectively, and then judges the following frame synchronous signal as a sector synchronous signal as discussed above.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method of judging a sector synchronous signal for a disk reproducing apparatus, comprising the step of:

a first step for decoding and storing a synchronous signal;

a second step for comparing the decoded synchronous signal with a reference sector synchronous signal;

a third step for assuming the detected synchronous signal to be a sector synchronous signal when the decoded synchronous signal and the reference sector synchronous signal are identical based on a result of the second step;

a fourth step for judging whether the synchronous signal stored before the decoded synchronous signal indicates a desired state; and a fifth step for finally judging that the assumed sector synchronous signal is a sector synchronous signal based on a result of the fourth step.

2. The method of claim 1, wherein the desired state is judged by the order in which the two synchronous signals are stored and by their respective values.

3. A method of judging a sector synchronous signal for a disk reproducing apparatus, comprising the steps of:

a first step for decoding a synchronous signal;

a second step for comparing the decoded synchronous signal with a reference sector synchronous signal;

a third step for assuming the decoded synchronous signal as a sector synchronous signal when the decoded synchronous signal and the reference sector synchronous signal are identical based on a result of the second step;

a fourth step for judging whether a relation between synchronous signals inputted before the decoded synchronous signal indicates a desired state; and a fifth step for finally judging that the assumed sector synchronous signal is a sector synchronous signal based on a result of the fourth step.

4. The method of claim 3, wherein in the fourth step, the desired state is judged by the order in which two synchronous signals are inputted successively and by their respective values.

5. A method of judging a sector synchronous signal for a disk reproducing apparatus, comprising the steps of:

a first step for decoding a synchronous signal;

a second step for comparing the synchronous signal with a reference sector synchronous signal;

a third step for assuming the decoded synchronous signal as a sector synchronous signal when the decoded synchronous signal and the reference sector synchronous signal are identical based on a result of the second step;

a fourth step for judging whether a period of the assumed synchronous signal and the previously judged sector synchronous signal represents a desired state; and a fifth step for finally judging that the assumed sector synchronous signal is a sector synchronous signal based on a result of the fourth step.

6. The method of claim 5, wherein in the fourth step, the period is measured by the number of frames counted between a previously judged sector synchronous signal and the following sector synchronous signal.

7. A method of judging a sector synchronous signal for a disk reproducing apparatus, comprising the steps of:

a first step for decoding a synchronous signal;

a second step for judging whether a relation between synchronous signals inputted before the decoded synchronous signal indicates a desired state;

a third step for judging whether a period of the decoded synchronous signal and a previously judged sector synchronous signal represents a desired value; and a fourth step for judging that the decoded synchronous signal is a sector synchronous signal based on results of said second and third judging steps without having to compare the decoded synchronous signal with a reference sector synchronous signal.

8. The method of claim 7, wherein in the second step, the desired state is judged by the order in which two synchronous signals are successively inputted and by their respective values.

9. The method of claim 7, wherein in the third step, the period is measured by the number of frames counted between the previously judged sector synchronous signal and the following sector synchronous signal.

10. A method of judging a sector synchronous signal for a disk reproducing apparatus, comprising the steps of:

a first step for decoding and storing synchronous signals;

a second step for judging whether a relation between two of the synchronous signals decoded and stored in the first step indicates a desired state;

a third step for assuming the following synchronous signal to be a sector synchronous signal based on a result of the second step;

a fourth step for judging whether a relation between synchronous signals inputted before the decoded synchronous signals indicates a desired state; and a fifth step for finally judging that the assumed sector synchronous signal is a sector synchronous signal based on a result of the fourth step.

11. The method of claim 10, wherein in the fourth step, the desired state is judged by the order in which the two synchronous signals are successively inputted and by their respective values.

12. A method of judging a sector synchronous signal for a disk reproducing apparatus, comprising the steps of:

a first step for decoding synchronous signals;

a second step for judging whether a relation between two synchronous signals which are successively inputted indicates a desired state;

a third step for assuming the following synchronous signal to be a sector synchronous signal based on a result of the second step;

a fourth step for comparing the following synchronous signal with a reference sector synchronous signal; and a fifth step for finally judging that the following synchronous signal is a sector synchronous signal based on a result of the fourth step.

13. The method of claim 12, wherein in the second step, the desired state is judged by the order in which the two synchronous signals are successively inputted and by their respective values.

14. A method of judging a sector synchronous signal for a disk reproducing apparatus, comprising the steps of:

a first step for decoding a synchronous signal;

a second step for judging whether a period counted from a previously judged sector synchronous signal represents a desired value;

a third step for assuming that the decoded synchronous signal is a sector synchronous signal based on a result of the second step;

a fourth step for comparing the decoded synchronous signal with a reference sector synchronous signal; and a fifth step for finally judging that the assumed synchronous signal is a sector synchronous signal based on a result of the fourth step.

15. The method of claim 14, wherein in the second step, the period is measured by the number of frames, which are counted between the previously judged sector synchronous signal and the following sector synchronous signal.

* * * * *